US006580286B1

United States Patent
Tennen (10) Patent No.: US 6,580,286 B1
(45) Date of Patent: Jun. 17, 2003

(54) METHOD AND APPARATUS FOR ACTIVE LINE TERMINATION

(75) Inventor: Aner Tennen, Marlboro, NJ (US)

(73) Assignee: GlobespanVirata, Inc., Red Bank, NJ (US)

(*) Notice: Subject to any disclaimer, the term of this patent is extended or adjusted under 35 U.S.C. 154(b) by 0 days.

(21) Appl. No.: 10/039,144

(22) Filed: Jan. 4, 2002

Related U.S. Application Data (60) Provisional application No. 60/261,453, filed on Jan. 11, 2001.

(51) Int. Cl.[7] .......................................... H03K 19/0175
(52) U.S. Cl. ............................. 326/30; 326/86; 326/83; 326/90; 327/108; 327/109; 327/110; 327/111; 327/112
(58) Field of Search .............................. 326/30, 83, 86, 326/90; 327/108–112

(56) References Cited

U.S. PATENT DOCUMENTS

| 5,856,758 A | 1/1999 | Joffe et al. ............... 330/69 |
| 6,100,717 A | 8/2000 | May ........................ 326/26 |
| 6,175,250 B1 * | 1/2001 | Hedberg ................... 326/83 |
| 6,429,685 B1 * | 8/2002 | Stockstad ................. 326/83 |

OTHER PUBLICATIONS

Signal and Noise Levels Underline ADSL Line Driver, Receiver Design Jim Quarfoot; Oct. 10, 2000.

* cited by examiner

Primary Examiner—Michael Tokar
Assistant Examiner—Vibol Tan
(74) Attorney, Agent, or Firm—Thomas, Kayden, Horstemeyer & Risley (57) ABSTRACT

An improved method and apparatus for active line termination is disclosed. An active termination line driver (ATLD) includes a pair of power amplifiers configured to amplify a transmit signal, the amplifiers comprise a first input for receiving the transmit signal, a second input for receiving a feedback signal, and an output configured to provide the amplified transmit signal to the load. The ATLD also includes a resistive network configured to provide the feedback signal from the outputs of the amplifiers to the second inputs power amplifiers. The resistive network is selectively configured to facilitate any one of a plurality of feedback configurations to emulate a back-matching impedance. Other embodiments of the present invention may be construed as methods for power efficiently driving a transmit signal to a load.

17 Claims, 6 Drawing Sheets

METHOD AND APPARATUS FOR ACTIVE LINE TERMINATION

CROSS-REFERENCE TO RELATED APPLICATION

This application claims the benefit of U.S. Provisional Application, Ser. No. 60/261,453, filed on Jan. 11, 2001 and entitled "Negative Feedback Current Sensing Active Termination Line-Driver," which is incorporated by reference herein in its entirety.

FIELD OF THE INVENTION

The present invention generally relates to high-speed data communications on a transmission line. More specifically, the invention relates to an improved method and apparatus for active line termination.

BACKGROUND OF THE INVENTION

With the advancement of technology, and the need for instantaneous information, the ability to transfer digital information from one location to another, such as from a central office (CO) to a customer premise (CP) has become more and more important.

In a digital subscriber line (DSL) communication system, and more particularly an xDSL system where "x" indicates a plurality of various standards used in the data transfer (e.g., ADSL, VDSL, SDSL, etc.), data is transmitted from a CO to a CP via a transmission line, such as a two-wire pair, and is transmitted from the CP to the CO as well, either simultaneously or in different communication sessions. The same transmission line might be utilized for data transfer by both sites or the transmission to and from the CO might occur on two separate lines.

Figure 1:
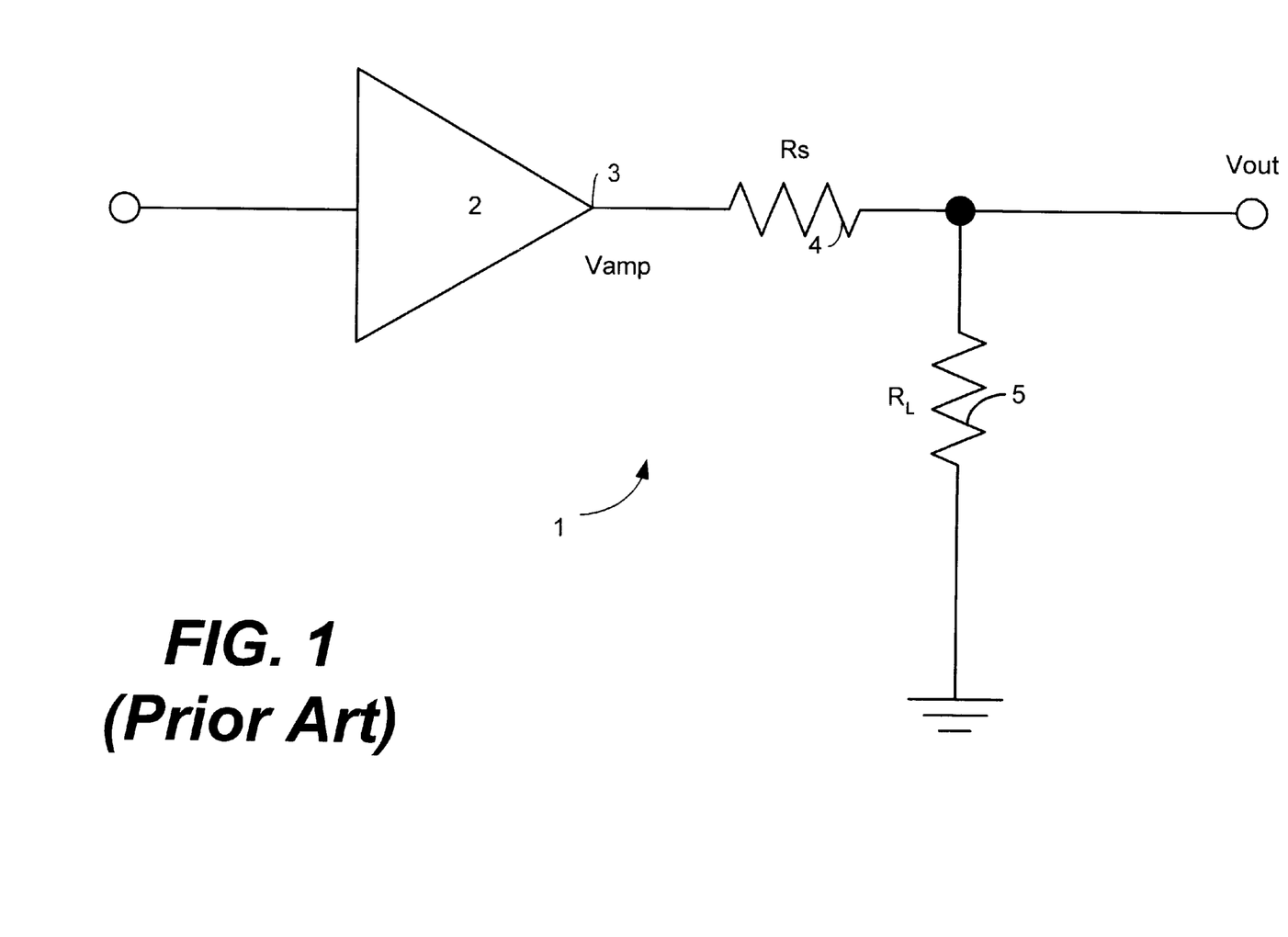
FIG. 1 is a prior art circuit schematic of a line driver that does not utilize active termination.

An xDSL communication system utilizes an amplifier, commonly termed a line driver, to amplify the transmit signal in order to drive it across a transmission line, where the transmission line spans a certain distance. The transmit signal must be amplified to increase the power of the signal in order to overcome the losses caused by the characteristic impedance of the line. As transmission speeds have increased, the need for highly-linear components to reduce distortion of the signal has grown. One way to reduce distortion of the signal is to reduce the reflections of the transmit signal caused by impedance mismatching, particularly between the output impedance of the line driver and the characteristic impedance of the line. FIG. 1 illustrates a line driver circuit 1 in which the output impedance of the line driver is matched to the characteristic impedance (or commonly called load impedance). This has been conventionally accomplished as diagrammatically illustrated in FIG. 1 by terminating the output 3 of a driver amplifier 2 with a line-coupling output resistor 4, the value $R_s$ of which is set equal to the impedance (e.g., 135 ohms, as a non-limiting example) of a load 5. The resulting voltage divider formed by output resistor 4 and line impedance 5 dissipates and therefore wastes half the driver's output power in the output impedance 4. This implies that for each volt of signal swing to be imparted to the line (load impedance 5) a two-volt swing is required at the output 3 of the amplifier 2.

To avoid using a large output resistor, a method known as active termination can be utilized. Active termination emulates a back-matching impedance, which, in series with a small output resistor, equals the output impedance of the line driver seen from the perspective of the transmission line looking into the output of the line driver. This reduces the need for a large output resistor, which, in turn, reduces the need for more power without reducing the effective power amplified on the transmit signal. So, with active termination, a transmit signal can be driven across a line, with reduced power supplied to the driver.

Generally, there are two main methods of active termination known in the art: "output voltage sense positive feedback" and "output current sense negative feedback." Positive feedback is the more popular method, but has several drawbacks. As the various resistance values of the positive feedback network are changed, the behavior of the circuit will qualitatively change as the signs (not only the magnitude) of the equivalent line driver gain, $A_O$, and the apparent back-matching resistance, $R_{OUT}$, change. These breaks or critical points in the functions defining both variables are characteristic of positive feedback systems. Positive feedback, in addition to introducing the qualitative changes noted above, also tends to emphasize or exaggerate component imperfections, system noise, and signal distortion.

Negative feedback active termination may avoid the drawbacks of the positive feedback configuration, but typically, requires an additional "sense amplifier" which leads to a more cumbersome and complex design, as well as increasing the overall cost of the line driver.

Accordingly, there is a need for a method and apparatus for active termination line driver with improved power efficiency that overcomes the drawbacks of the prior art.

SUMMARY OF THE INVENTION

The present invention relates to an improved method and apparatus for active line termination. In this regard, an active termination line driver (ATLD) configured to drive a transmit signal across a load is provided. The ATLD includes a pair of power amplifiers configured to amplify a transmit signal, the amplifiers comprise a first input for receiving the transmit signal, a second input for receiving a feedback signal, and an output configured to provide the amplified transmit signal to the load. The ATLD also includes a resistive network configured to provide the feedback signal from the outputs of the amplifiers to the second inputs of the power amplifiers. The resistive network is selectively configured to facilitate any one of a plurality of feedback configurations to emulate a back-matching impedance.

In another embodiment, an ATLD includes a differential amplifier configured to amplify a transmit signal, the differential amplifier comprises a pair of inputs for receiving the transmit signal and a pair of outputs configured to provide the amplified transmit signal to the load. The ATLD also includes a resistive network configured to provide a feedback signal from the outputs of the differential amplifier to the inputs of the differential amplifier. The resistive network is selectively configured to facilitate any one of a plurality of feedback configurations to emulate a back-matching impedance.

Embodiments of the invention may also be provided as methods for power-efficiently driving a transmit signal to a load. One method comprises the steps of: selectively configuring a resistive feedback network comprised in a line driver, wherein the resistive feedback network is configured to facilitate any one of a plurality of feedback configurations; applying a transmit signal to an input of the line driver; amplifying the transmit signal; applying the amplified transmit signal to the load; sensing at least a first electrical property generated by amplifying the transmit signal; and applying at least the first electrical property to the passive resistive feedback network to generate a feedback signal responsive to at least the first electrical property such that an output impedance emulates a back-matching resistor.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION

Figure 2:
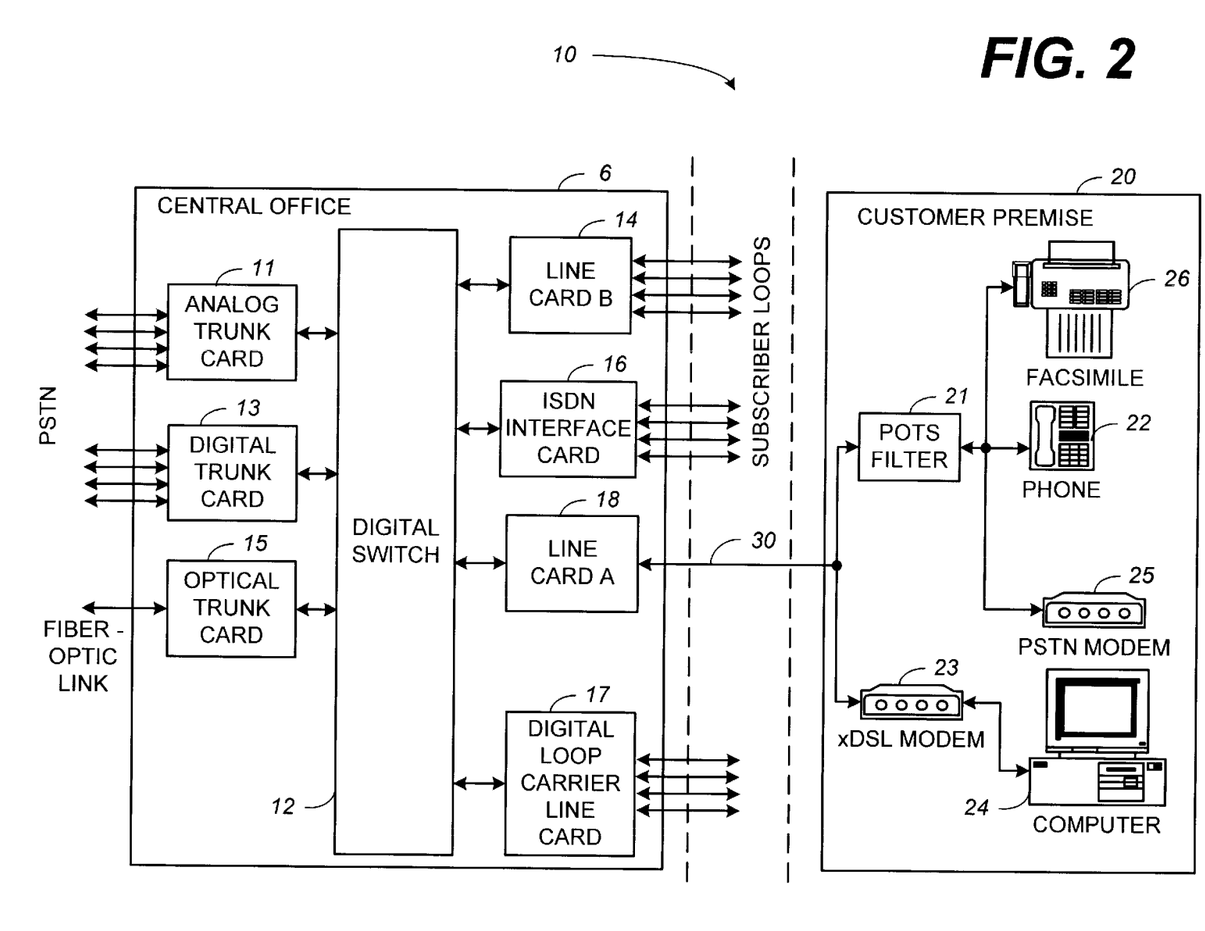
FIG. 2 is a block diagram illustrating an xDSL communications system between a central office (CO) and a customer premise (CP).

Turning now to the drawings illustrating the present invention, wherein like reference numerals designate corresponding parts throughout the drawings, FIG. 2 illustrates an xDSL communication system 10. Specifically, FIG. 2 illustrates communication between a central office (CO) 6 and a customer premise (CP) 20 by way of two-wire pair telephone line 30 (or local loop). While the CP 20 may be a single-dwelling residence, a small business, or other entity, it is generally characterized as having plain old telephone system (POTS) equipment, such as a telephone 22, a public switched telephone network (PSTN) modem 25, a facsimile machine 26, etc. The CP 20 may also include an xDSL communication device, such as an xDSL modem 23 that may permit a computing device 24 to communicate with one or more remote networks via the CO 6. When an xDSL service is provided, a POTS filter 21 might be interposed between the POTS equipment 22 and the telephone line 30. The POTS filter 21 includes a low-pass filter having a cut-off frequency of approximately 4 kilohertz to 10 kilohertz, in order to filter high frequency transmissions from the xDSL communication device 23 and to protect the POTS equipment from the higher frequency xDSL equipment (e.g., the phone 22 and the facsimile machine 26).

At the CO 6, additional circuitry is typically provided. Generally, a line card (i.e., Line Card A) 18 containing line interface circuitry is provided to communicatively couple various xDSL service related signals along with PSTN voice signals to the twisted-pair telephone line 30. In fact, multiple line cards 14 and 18 may be provided to serve a plurality of copper telephone subscriber loops. In the same way, additional interface circuit cards are typically provided at the CO 6 to handle different types of services. For example, an integrated services digital network (ISDN) interface card 16, a digital loop carrier line card 17, and other circuit cards, for supporting similar and other communication services, may be provided. Since the architecture and circuitry typically provided at a CO 6 are well-known, they need not be described herein.

A digital switch 12 is also provided at the CO 6 and is configured to communicate with each of the various line cards 14, 16, 17, and 18. At a PSTN interface side of the CO (i.e., the side opposite the various line cards 14, 16, 17, and 18 supporting the telephone subscriber loops), a plurality of trunk cards 11, 13, and 15 are typically provided. For example, an analog trunk card 11, a digital trunk card 13, and an optical trunk card 15 are illustrated in FIG. 2. Typically, these circuit cards have outgoing lines that support numerous multiplexed xDSL service signal transmissions.

Figure 3:
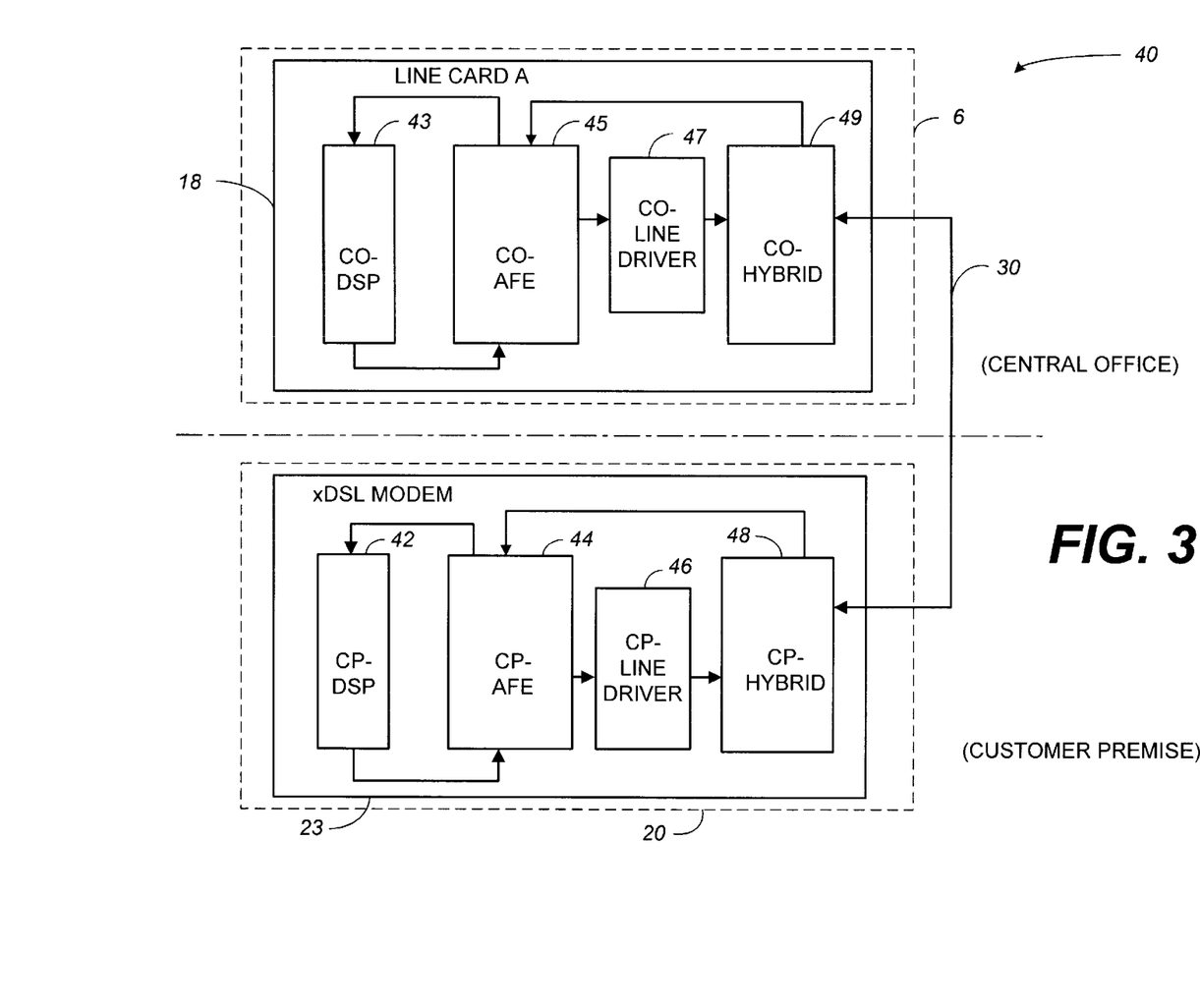
FIG. 3 is a functional block diagram illustrating an xDSL communication link used in the xDSL communication system of FIG. 2 between a line card and an xDSL modem.

Having introduced a conventional xDSL communication system 10 as illustrated and described in relation to FIG. 2, reference is now directed to FIG. 3, which is a block diagram further illustrating the various functional elements 40 in an xDSL line card 18 located within a CO 6 and an xDSL modem 23 located at a CP 20 as introduced in FIG. 2. In this regard, FIG. 3 illustrates data transmission from a CO 6 to a CP 20 via a transmission line 30, such as, a two-wire pair telephone transmission line, as may be provided by a POTS service provider to complete a designated link between a CO 6 and a CP 20. In addition, FIG. 3 further illustrates data transmission from the CP 20 to the CO 6 via the same two-wire pair telephone transmission line 30. With regard to the present illustration, transmission of data may be directed from the CP 20 to the CO 6, from the CO 6 to the CP 20 or in both directions simultaneously. Furthermore, data transmissions can flow on the same two-wire pair telephone transmission line 30 in both directions, or alternatively on separate transmission lines (one shown for simplicity of illustration). Each of the separate transmission lines may be designated to carry data transfers in a particular direction either to or from the CP 20.

The CO 6 may include a line card 18 (see FIG. 1) that includes a CO-digital signal processor (DSP) 43, which receives digital information from one or more data sources (not shown) and sends the digital information to a CO-analog front end (AFE) 45. The CO-AFE 45 interposed between the two-wire pair telephone transmission line 30 and the CO-DSP 43 may convert digital data, from the CO-DSP 43, into a continuous time analog signal for transmission to the CP 20 via the one or more telephone transmission lines 30.

One or more analog signal representations of digital data streams supplied by one or more data sources (not shown) may be converted in the CO-AFE 45 and further amplified and processed via a CO-line driver 47 before transmission by a CO-hybrid 49, in accordance with the amount of power required to drive an amplified analog signal through the two-wire pair telephone transmission line 30 to the CP 20.

As is also illustrated in FIG. 3, the xDSL modem 23 located at the CP 20 may comprise a CP-hybrid 48. The CP-hybrid 48 may be used to de-couple a received signal from the transmitted signal in accordance with the data modulation scheme implemented by the particular xDSL data transmission standard in use. A CP-AFE 44, also located at the CP 20, may be configured to receive the de-coupled received signal from the CP-hybrid 48. The CP-AFE 44 may be configured to convert the received analog signal into a digital signal, which may then be transmitted to a CP-DSP 42 located at the CP 20. Finally, the digital information may be further transmitted to one or more specified data sources such as the computer 24 (see FIG. 2).

In the opposite data transmission direction, one or more digital data streams supplied by one or more devices in communication with the CP-DSP 42 at the CP 20 may be converted by the CP-AFE 44 and further amplified via CP-line driver 46. As will be appreciated by those skilled in the art, the CP-line driver 46 may amplify and forward the transmit signal with the power required to drive an amplified analog signal through the twisted-pair telephone transmission line 30 to the CO 6. It is significant to note that the CP-hybrid 48 is used to regenerate the transmit signal so it may be subtracted from the receive signal when the DSL communication system 10 is receiving at the CP 20. As a result, the CP-hybrid 48 does not affect the transmitted signal in any way. The CO-AFE 45 may receive the data from the CO-hybrid 49, located at the CO 6, which may de-couple the signal received from the CP 20 from the signal transmitted by the CO 6. The CO-AFE 45 may then convert the received analog signal into one or more digital signals, which may then be forwarded to the CO-DSP 43 located at the CO 6. Finally, the digital information may be further distributed to one or more specified data sources (not shown) by the CO-DSP 43.

It is significant to note that the description presented herein will focus on the line driver 47 (FIG. 3) located within the line card A 18 at the CO 6 within an xDSL communication system 10 (FIG. 2). This explanation and description are by way of example only. Those skilled in the art will appreciate that the concepts and teachings of the present invention may be applied to various line drivers as may be applied in a plethora of systems.

Figure 4:
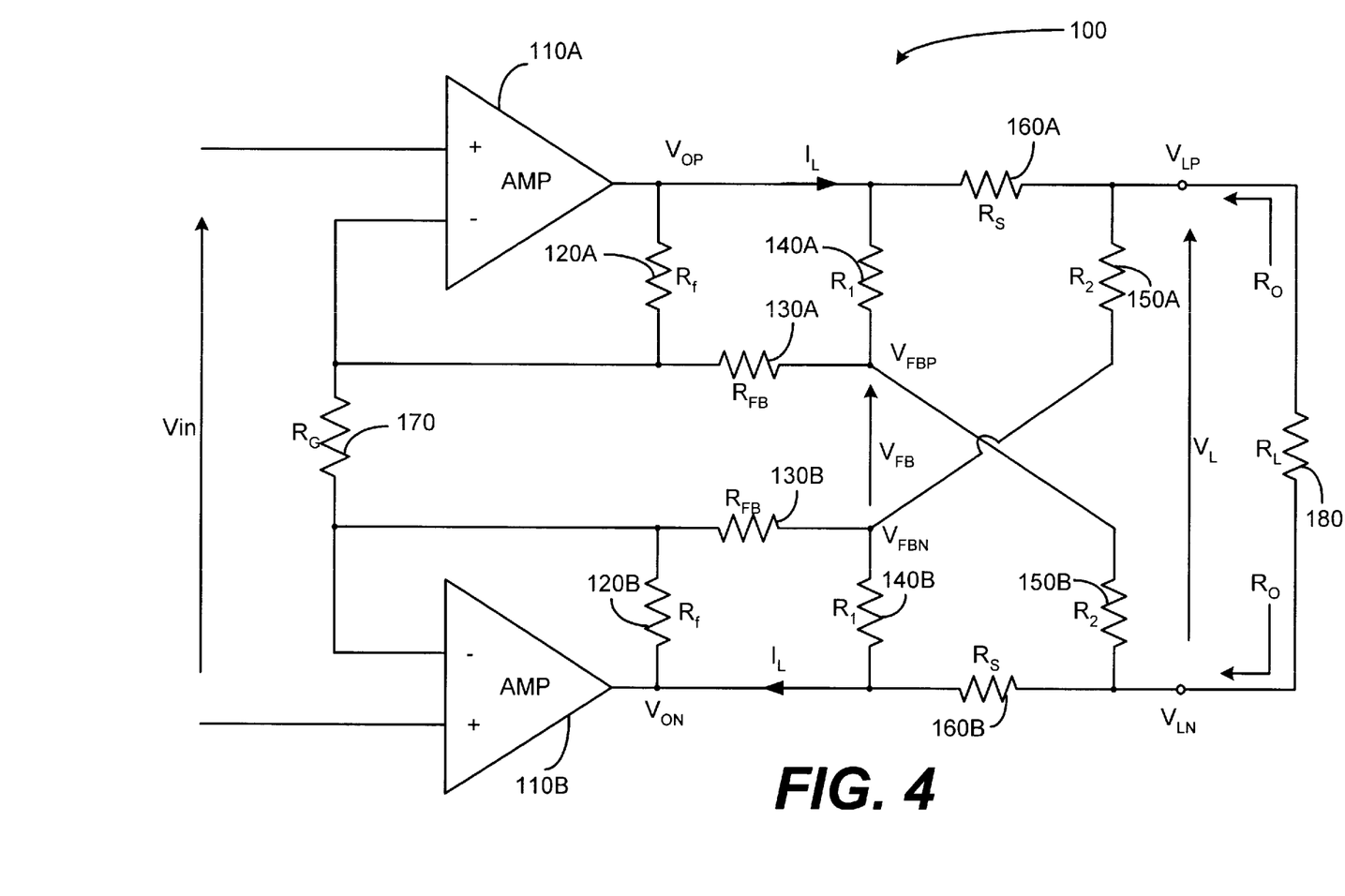
FIG. 4 is a circuit schematic of an embodiment of the present invention.

FIG. 4 illustrates a line driver circuit 100 (located in the line driver 47) of an embodiment of the present invention. The line driver circuit 100 utilizes current sensing, negative feedback active termination. The circuit 100 of FIG. 4 is symmetrical about the load 180, hereinafter labeled $R_L$. Two operational amplifiers (op-amps) 110A and 110B perform the amplification of a transmit signal, $V_{in}$. A resistive feedback network comprising several resistive elements provides a feedback signal to the amplifiers and in conjunction with the op-amps 110a and 110b provides the means for emulating a back-matching resistor.

As described above, it is desirable to match the impedances of a system. This prevents reflections of the transmit signal and therefore improves the general performance of the system. In this case, it is desirable to match the effective output impedance, $R_O$, with $R_L$. $R_L$ comprises the characteristic impedance looking into the transmission line from the output of the line driver circuit. This may include the impedance of a hybrid, the transmission line impedance, and the effective input impedance of the receiver. If one was not to use active termination (which would essentially remove the resistive feedback network), the effective output impedance, $R_O$ would simply be the output resistors 160A and 160B, hereinafter labeled $R_S$, summed together. For example, if $R_L$ was found to be 200 Ω, each $R_S$ would have to be 100 Ω. In this case, the power required to drive the signal through the amplifiers, through $R_S$ and across the load would be high. In fact, half the voltage required to transmit the signal would be lost in $R_S$. Active termination avoids this by emulating a back-matching resistor that in series with $R_S$ equals $R_O$. Therefore, $R_S$ can substantially be reduced which reduces the power necessary to transmit the signal. The resistive feedback network and the op-amps of 100 perform the emulation of the back-matching resistor.

Op-amp 110A receives a first half (positive signal) of the transmit signal and outputs the amplified positive portion of the transmit signal, $V_{op}$. The op-amp 110A has a second input that is connected to the resistive feedback network and receives as an input a feedback signal. Op-amp 110B likewise receives a second half (negative signal) of the transmit signal and outputs the amplified negative portion of the transmit signal, $V_{on}$. The op-amp 110B also has a second input that is connected to the resistive feedback network and receives as an input the feedback signal.

Hereinafter, in describing FIG. 4, for simplicity, reference will be made to only one half (the positive half) of the circuit 100. It will be understood that, due to symmetry, like components of the other half of the circuit 100 will have the same general features as those described and will behave in relatively the same manner.

The resistive feedback network connects the output of the op-amp 110A to $R_L$. The resistive feedback network, as mentioned, also provides the feedback signal back to the op-amp 110A to emulate the back-matching impedance. In this embodiment, the network comprises only passive elements. Other impedance devices could be used such as active or reactive impedance elements. For example, biased MOSFETs, JFETs, polysilicon resistors, diodes, well resistors, bipolar transistors, etc. The output resistor, $R_S$, series connects the output of the op-amp 110A to the load 180. Several other resistors are used to provide a feedback signal to the op-amp 110A. Feedback resistor 120A, hereinafter $R_F$, directly connects the output of the op-amp 110A to the feedback input (in this case the negative input) of the op-amp 110A. Resistor 140A, hereinafter R1, connects the output of the op-amp 110A to a second terminal of resistor 130A, hereinafter $R_{FB}$. A first terminal of $R_{FB}$ is connected to the feedback input of the op-amp 110A. Cross-resistor 150B (from negative half of the circuit 100), hereinafter $R_2$, connects between the first terminal of $R_{FB}$ and the negative side of the load 180. Likewise $R_2$ (150A) of the positive half of the circuit 100 connects similar components of the other half of the circuit 100 and the positive side of the load 180. Resistor 170, $R_G$ connects the two feedback inputs of the op-amps 110A and 110B to each other.

Having described the architecture of the composite line driver circuit 100 of FIG. 4 hereinabove, the following discussion will focus on circuit 100 operation in order to highlight the various functional aspects. The resistance of $R_L$ is considerably greater than $R_S$ ($R_L > R_S$ on the order of 5–10 times). In the classical line driver circuit, the resistance of $R_S$ would match that of $R_L$. This reduction in $R_S$ greatly reduces the voltage drop across, therefore reducing the needed power input to drive the signal. Resistors $R_1$ and $R_2$ are relatively equal and are both an order of magnitude greater than $R_S$. For the purposes of this document, relatively equal could be within a tolerance of +/−10%. With these resistor values, the current sensing negative feedback configuration is enabled.

The voltage at the connection of $R_1$ and $R_S$ (the output of op-amp 110A) shall be labeled $V_{OP}$. The voltage on the other end of $R_S$ shall be labeled $V_{LP}$. Using simple circuit analysis and Ohm's law, the voltage drop across $R_S$ assumes the following equation:

$$V_{OP} - V_{LP} = I_L * R_S \qquad \text{Eq. 1}$$

Using this equation, the current $I_L$ passing through $R_S$ can be "sensed". The voltage at the connection between $R_2$ (15B) and $R_S$ (160B) shall be labeled $V_{LN}$ and, because of symmetry, is the reciprocal of $V_{LP}$. $R_1$ (140A) and $R_2$ (150B) form a voltage divider therefore producing the following equation for $V_{FBp}$:

$$V_{FB_p} = (V_{OP} + V_{LN})/2 = (V_{OP} - V_{LP})/2 = (I_L * R_S)/2 \qquad \text{Eq. 2}$$

And similarly because of symmetry:

$$V_{FB_N} = -V_{FB_P} = -(I_L * R_S)/2 \qquad \text{Eq. 3}$$

Therefore, $$V_{FB} = V_{FB_P} - V_{FB_N} = I_L * R_S \qquad \text{Eq. 4}$$

This differential voltage, $V_{FB}$, can be passed through two inverting amplifiers, formed by op-amps 110A and 110B, their feedback resistors $R_f$, and their input resistors $R_{FB}$. The voltage at the output of op-amp 110A is then:

$$V_{OP} = -\left(V_{FB} * \frac{R_F}{R_{FB}}\right)/2 = -\left(I_L * R_S * \frac{R_F}{R_{FB}}\right)/2 \qquad \text{Eq. 5}$$

The effective output resistance, $R_O$, after emulation, now becomes (after some mathematical manipulation to Eq. 5):

$$R_O = 2 * \left(\frac{R_O}{2}\right) = 2 * R_S * \left(1 + \frac{R_f}{2 * R_{FB}}\right) \qquad \text{Eq. 6}$$

The amplification supplied by the op-amps 110A and 110B have been utilized to amplify the effective output resistance. Using example values of $R_S=4\Omega$, $R_f/R_{FB}=10$, the effective output resistance, $R_O=48\Omega$.

There are several advantages to the circuit 100. One such advantage is that the resistive feedback network does not contain any active elements (particularly a "sense amplifier") required to amplify the feedback signal before sending it to the op-amps 110A and 110B. The absence of any active elements simplifies the complexity of the circuit 100 and reduces the overall cost of the line driver 47. The passive elements that make up the resistive feedback network typically take up a very small amount of area on a printed circuit board (PCB) or integrated circuit (IC).

Another advantage to this circuit, is that by removing resistors 140A and 140B, and shorting resistors 130A and 130B, a voltage sense positive feedback configuration is formed. This gives the designer the flexibility to utilize either configuration.

In both configurations, the circuit 100 has a high input impedance which helps isolate the line driver from the AFE 45 (See FIG. 3) and a high common mode rejection ratio (CMRR) which are preferred characteristics of xDSL line drivers.

Figure 5:
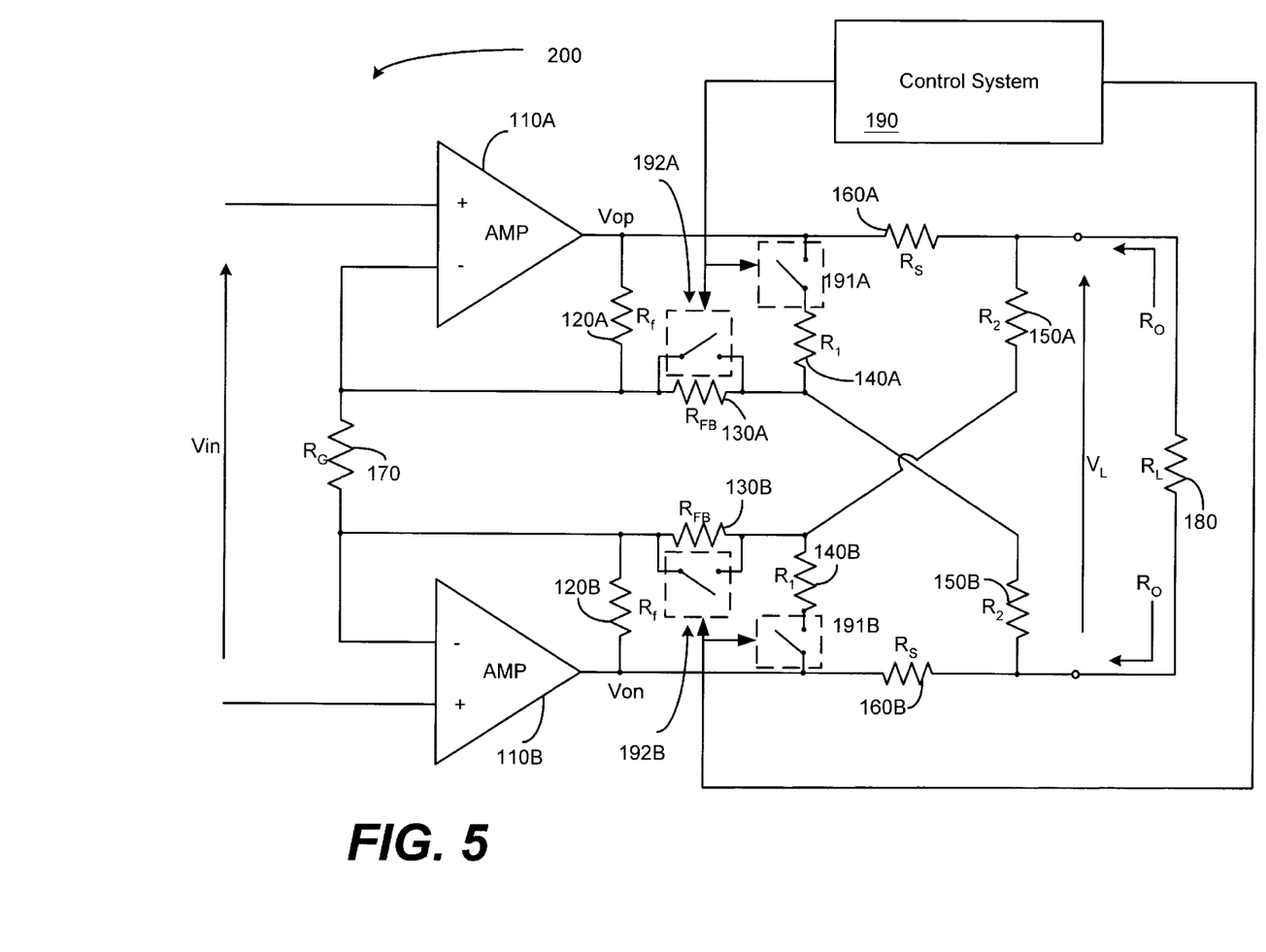
FIG. 5 is a circuit schematic of another embodiment of the present invention.

FIG. 5 is another embodiment of the invention and is similar to that of FIG. 4, except that a control system 190 has been included to switch the resistive feedback network of the line driver circuit 200 between a current-sense feedback configuration and a voltage-sense positive feedback configuration. Switches 192A and 192B are connected across resistors 130A and 130B, respectively. Switch 191A is connected between the output of the op-amp 110A and the resistor 140A. Likewise, switch 191B is connected between the output of the op-amp 110B and the resistor 140B. Each switch is controlled by the control system 190.

In practice, switches 192A and 192B, when closed, bypass resistors 130A and 130B. When switches 192A and 192B were closed, switches 191A and 191B are open, essentially removing resistors 140A and 140B from the circuits. In this case, the resistive feedback network is in the voltage-sense positive feedback configuration. If the switches were switched back, so switches 192A and 192B were open and switches 191A and 191B were closed, the current-sense negative feedback configuration is attained.

The control system 190 could contain many various means of control. For instance, the control system could comprise of a simple toggle button, switching the switches back and forth. The control system could be a computer system in which a program is configured to receive an input signal, process the signal, and thus switch the switches accordingly. The control system could be set to operate upon start-up of transmission or perhaps, continuously during transmission in order to optimize performance of the line driver. The specific means of control performed by the control system 190 and the means in which the control system 190 operates is not intended to be limited by this or any other embodiments of the present invention.

An example circuit 200 having been described above, operation of the system will now be discussed. In the discussion that follows, a flow chart is provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 6:
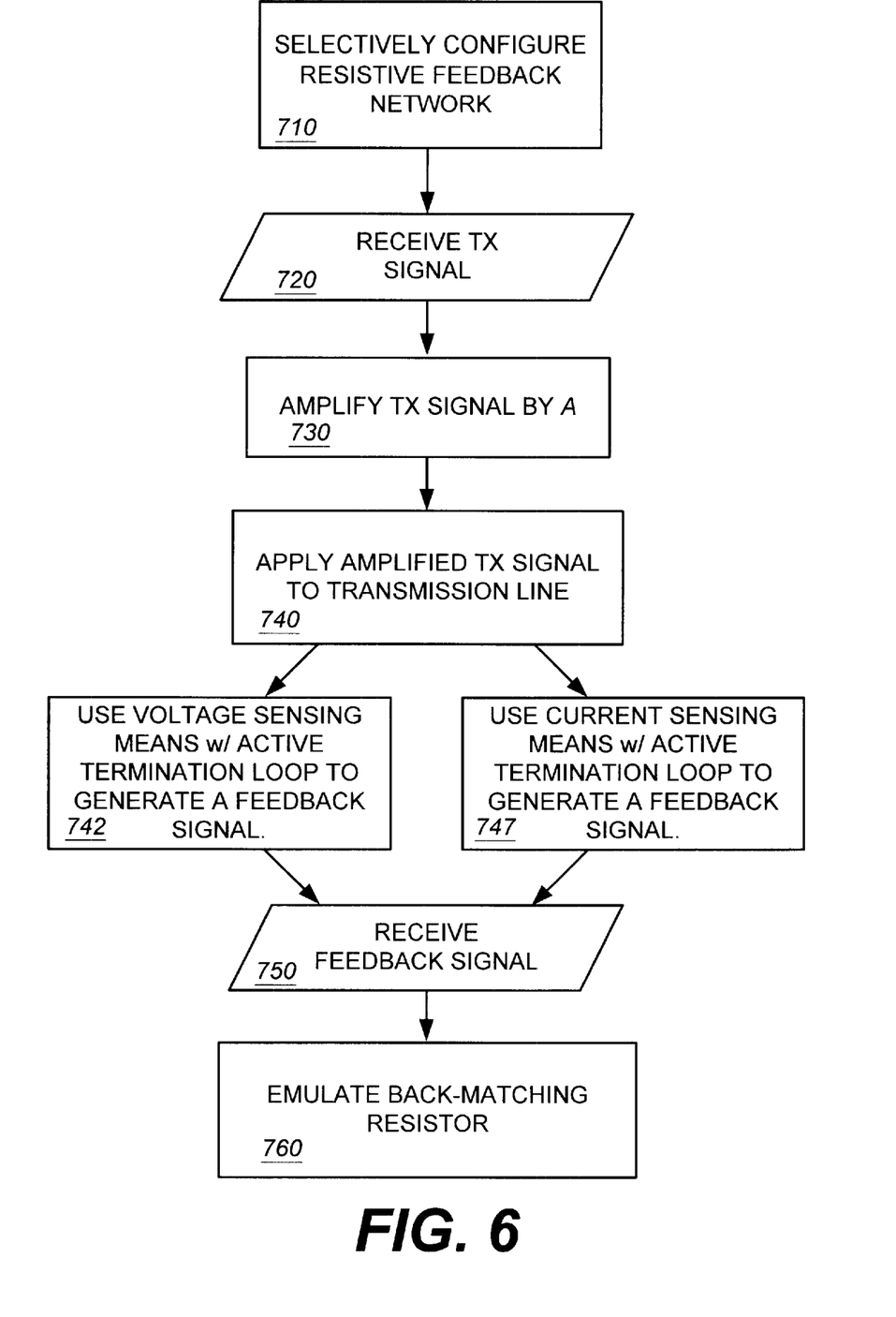
FIG. 6 is a flow chart illustrating a representative method of the present invention.

FIG. 6 is a flow chart illustrating a representative method of the present invention, an in particular pertains to the operation of the line driver circuit 200 of FIG. 5. The resistive feedback network is selectively configured to facilitate either the current-sense negative feedback configuration or the voltage sense positive feedback configuration (step 710). This can be accomplished by the control system 190 operating the switches. The transmit signal is received (step 720) and amplified (step 730). The op-amps 110A and 110B, as mentioned earlier, receive the transmit signal and, in turn, amplify it. From there, the amplified transmit signal can be supplied to the transmission line (load 180). The output voltage (step 742) or output current (step 747) can then be sensed. Typically, this would be accomplished by measuring the voltage across the output resistor $R_S$ or measuring the current flowing through the $R_S$. From there, this information in the form of a feedback signal is received (step 750) where, in turn, the back-matching resistance is emulated (step 760). In the circuit 200 of FIG. 5, the op-amps 110A and 110B would receive the feedback signal and emulate the back-matching resistance.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. An active termination line driver (ATLD) having a pair of input nodes and a pair of output nodes, wherein a transmit signal is connected across the input nodes and an amplified version of the transmit signal is driven across a load connected to the output nodes, the ATLD comprising:

a first power amplifier comprising a first input coupled to an input node of the line driver, a second input for receiving a feedback signal, and an output configured to provide the amplified transmit signal to the load;

a second power amplifier comprising a first input coupled to the other input node of the line driver, a second input for receiving a feedback signal, and an output configured to provide the amplified transmit signal to the load; and a resistive network configured to provide the feedback signal from the outputs of the first and second power amplifiers to the second inputs of the first and second power amplifiers, respectively;

wherein the resistive network is selectively configured to facilitate a voltage-sense positive feedback configuration or a current-sense negative feedback configuration to emulate a back-matching impedance.

2. An active termination line driver (ATLD) having a pair of input nodes and a pair of output nodes, wherein a transmit signal is connected across the input nodes and an amplified version of the transmit signal is driven across a load connected to the output nodes, the ATLD comprising:

a first power amplifier comprising a first input coupled to an input node of the line driver, a second input for receiving a feedback signal, and an output configured to provide the amplified transmit signal to the load;

a second power amplifier comprising a first input coupled to the other input node of the line driver, a second input for receiving a feedback signal, and an output configured to provide the amplified transmit signal to the load;

a resistive network configured to provide the feedback signal from the outputs of the first and second power amplifiers to the second inputs of the first and second power amplifiers, respectively; and a control system to selectively configure the resistive network to facilitate any one of a plurality of feedback configurations to emulate a back-matching impedance.

3. An active termination line driver (ATLD) having a pair of input nodes and a pair of output nodes, wherein a transmit signal is connected across the input nodes and an amplified version of the transmit signal is driven across a load connected to the output nodes, the ATLD comprising:

a first power amplifier comprising a first input coupled to an input node of the line driver, a second input for receiving a feedback signal, and an output configured to provide the amplified transmit signal to the load;

a second power amplifier comprising a first input coupled to the other input node of the line driver, a second input for receiving a feedback signal, and an output configured to provide the amplified transmit signal to the load; and a resistive network configured to provide the feedback signal from the outputs of the first and second power amplifiers to the second inputs of the first and second power amplifiers, respectively, the resistive network comprising:

a first resistive element coupled between the second inputs of the power amplifiers;

a second resistive element coupled between the output of the first power amplifier and the second input of the first power amplifier;

a third resistive element coupled between the output of the second power amplifier and the second input of the second power amplifier;

a fourth resistive element coupled between the output of the first power amplifier and the first output node;

a fifth resistive element coupled between the output of the second power amplifier and the second output node;

a sixth resistive element having a first terminal and a second terminal, wherein the first terminal is coupled to the output of the first power amplifier;

a seventh resistive element having a first terminal and a second terminal, wherein the first terminal is coupled to the output of the second power amplifier;

an eighth resistive element coupled between the second terminal of the sixth resistive element and the second input of the first power amplifier;

a ninth resistive element coupled between the second terminal of the seventh resistive element and the second input of the second power amplifier;

a tenth resistive element coupled between the first output node and the second terminal of the seventh resistive element; and an eleventh resistive element coupled between the second output node and the second terminal of the sixth resistive element;

wherein the resistive network is selectively configured to facilitate any one of a plurality of feedback configurations to emulate a back-matching impedance.

4. The line driver of claim 3, wherein the resistance of the sixth resistive element is substantially equal to the sum of the resistances of the fourth resistive element and the tenth resistive element, and further wherein the resistance of the seventh resistive element is substantially equal to the sum of the resistances of the fifth resistive element and the eleventh resistive element.

5. The line driver of claim 4, wherein the resistance of the sixth resistive element is considerably greater than the resistance of the load, and the resistance of the load is considerably greater than the resistance of the fourth resistive element, and further wherein the resistance of the seventh resistive element is considerably greater than the resistance of the load, and the resistance of the load is considerably greater than the resistance of the fifth resistive element, therefore producing a current-sensing negative feedback configuration.

6. The line driver of claim 3, further comprising:

a first switch configured to connect and disconnect the first terminal of the sixth resistive element to the output of the first power amplifier;

a second switch configured to connect and disconnect the first terminal of the seventh resistive element to the output of the second power amplifier;

a third switch configured to bypass, when closed, the eighth resistive element; and a fourth switch configured to bypass, when closed, the ninth resistive element, wherein the switches are controlled by a control system.

7. The line driver of claim 6, wherein a voltage-sensing positive feedback configuration is produced when the first and second switches are open and the third and fourth switches are closed.

8. A method for power-efficiently driving a transmit signal to a load, the method comprising the steps of:

selectively configuring a resistive feedback network by means of a control system;

amplifying the transmit signal;

applying the amplified transmit signal to the load;

sensing at least a first electrical property generated by amplifying the transmit signal; and applying at least the first electrical property to the resistive feedback network to generate a feedback signal responsive to at least the first electrical property such that an output impedance emulates a back-matching resistor.

9. A method for power-efficiently driving a transmit signal to a load, the method comprising the steps of:
- selectively configuring a resistive feedback network, wherein the resistive feedback network is configured to facilitate a voltage-sense positive feedback configuration or a current-sense negative feedback configuration;
- amplifying the transmit signal;
- applying the amplified transmit signal to the load;
- sensing at least a first electrical property generated by amplifying the transmit signal; and
- applying at least the first electrical property to the resistive feedback network to generate a feedback signal responsive to at least the first electrical property such that an output impedance emulates a back-matching resistor.

10. The method of claim 9, wherein the output voltage is sensed and applied to the feedback network when the resistive network is configured to the voltage-sense positive feedback configuration.

11. The method of claim 9, wherein the output current is sensed and applied to the feedback network when the resistive network is configured to the current-sense negative feedback configuration.

12. An active termination line driver (ATLD) comprising:
- a differential amplifier configured to amplify a transmit signal, the differential amplifier, comprising a pair of inputs for receiving the transmit signal and a pair of outputs configured to provide the amplified transmit signal to a load; and
- a resistive network configured to provide a feedback signal from the outputs of the differential amplifier to the inputs of the differential amplifier;
- the resistive network selectively configured to facilitate a voltage-sense positive feedback configuration or a current-sense negative feedback configuration to emulate a back-matching impedance.

13. The line driver of claim 12, wherein resistive network comprises only passive elements.

14. An active termination line driver (ATLD) comprising:
- a differential amplifier configured to amplify a transmit signal, the differential amplifier comprising a pair of inputs for receiving the transmit signal and a pair of outputs configured to provide the amplified transmit signal to a load;
- a resistive network configured to provide a feedback signal from the outputs of the differential amplifier to the inputs of the differential amplifier; and
- a control system to selectively configure the resistive network to facilitate any one of a plurality of feedback configurations to emulate a back-matching impedance.

15. An active termination line driver (ATLD) comprising:
- means for amplifying a transmit signal; and
- means for emulating a back-matching resistance using a negative feedback circuit configuration, wherein the negative feedback circuit configuration is comprised of a resistive network,
- wherein the resistive network is comprised of only passive elements, including:
  - a first resistive element coupled between the second inputs of the power amplifiers;
  - a second resistive element coupled between the output of the first power amplifier and the second input of the first power amplifier;
  - a third resistive element coupled between the output of the second power amplifier and the second input of the second power amplifier;
  - a fourth resistive element coupled between the output of the first power amplifier and the first output node;
  - a fifth resistive element coupled between the output of the second power amplifier and the second output node;
  - a sixth resistive element having a first terminal and a second terminal, wherein the first terminal is coupled to the output of the first power amplifier;
  - a seventh resistive element having a first terminal and a second terminal, wherein the first terminal is coupled to the output of the second power amplifier;
  - an eighth resistive element coupled between the second terminal of the sixth resistive element and the second input of the first power amplifier;
  - a ninth resistive element coupled between the second terminal of the seventh resistive element and the second input of the second power amplifier;
  - a tenth resistive element coupled between the first output node and the second terminal of the seventh resistive element; and
  - an eleventh resistive element coupled between the second output node and the second terminal of the sixth resistive element.

16. The line driver of claim 15, wherein the resistance of the sixth resistive element is substantially equal to the sum of the resistances of the fourth resistive element and the tenth resistive element, and further wherein the resistance of the seventh resistive element is substantially equal to the sum of the resistances of the fifth resistive element and the eleventh resistive element.

17. The line driver of claim 16, wherein the resistance of the sixth resistive element is considerably greater than the resistance of the load, and the resistance of the load is considerably greater than the resistance of the fourth resistive element, and further wherein the resistance of the seventh resistive element is considerably greater than the resistance of the load, and the resistance of the load is considerably greater than the resistance of the fifth resistive element, therefore producing a current-sensing negative feedback configuration.

* * * * *